(12) United States Patent
Vohra

(10) Patent No.: US 9,873,624 B2
(45) Date of Patent: Jan. 23, 2018

(54) METHODS AND SYSTEMS FOR SELENOCYANATE REMOVAL FROM CONTAMINATED AQUEOUS MEDIA

(71) Applicant: King Fahd University of Petroleum and Minerals, Dhahran (SA)

(72) Inventor: Muhammad Shariq Vohra, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 433 days.

(21) Appl. No.: 14/694,446

(22) Filed: Apr. 23, 2015

(65) Prior Publication Data
US 2016/0311711 A1    Oct. 27, 2016

(51) Int. Cl.
| | | |
|---|---|---|
| *C02F 1/32* | (2006.01) | |
| *C02F 1/70* | (2006.01) | |
| *C02F 1/72* | (2006.01) | |
| *C02F 101/20* | (2006.01) | |
| *C02F 103/10* | (2006.01) | |
| *C02F 103/18* | (2006.01) | |
| *C02F 103/34* | (2006.01) | |
| *C02F 1/68* | (2006.01) | |
| *C02F 101/10* | (2006.01) | |
| *C02F 103/36* | (2006.01) | |

(52) U.S. Cl.
CPC ............... *C02F 1/725* (2013.01); *C02F 1/32* (2013.01); *C02F 1/68* (2013.01); *C02F 1/70* (2013.01); *C02F 2101/106* (2013.01); *C02F 2103/10* (2013.01); *C02F 2103/18* (2013.01); *C02F 2103/365* (2013.01); *C02F 2305/10* (2013.01); *Y02E 20/16* (2013.01); *Y02E 20/18* (2013.01)

(58) Field of Classification Search
None
See application file for complete search history.

(56) References Cited

U.S. PATENT DOCUMENTS

| | | | |
|---|---|---|---|
| 2007/0007121 A1 | 1/2007 | Guo et al. | |
| 2011/0204000 A1* | 8/2011 | Reed | C02F 1/283 210/721 |
| 2014/0151301 A1* | 6/2014 | Maruo | B01J 35/002 210/638 |
| 2014/0196629 A1* | 7/2014 | Carlson | C09D 5/1681 106/18.32 |

OTHER PUBLICATIONS

Photocatalytic Reduction of Se(VI).pdf—Photocatalytic Reduction of Se(VI) in Aqueous SOlutions in UV/TiO2 System—Tan, Timothy et al—Journal of Physical Chemistry—2003.*

(Continued)

*Primary Examiner* — Krishnan S Menon
*Assistant Examiner* — Bradley R Spies
(74) *Attorney, Agent, or Firm* — Oblon, McClelland, Maier & Neustadt, L.L.P.

(57) ABSTRACT

A process of removing selenocyanate from an aqueous medium contaminated with at least selenocyanate. In the presence of UV light and $TiO_2$ as a photocatalyst, selenocyanate is initially photolyzed to release Se(0). Se(0) is then oxidized to Se(IV) and finally Se(VI) by free radicals generated by the photocatalyst. After the oxidation is complete, a hole scavenger is added and mixed with the aqueous medium to trigger the reduction of Se(VI) to Se(0).

17 Claims, 2 Drawing Sheets

(56) References Cited

OTHER PUBLICATIONS

Effects of organic hole scavengers on the photocatalytic reduction of selenium anions.pdf—Effects of organic hole scavengers on the photocatalytic reduction of selenium ions—Tan, T. et al—Journal of Photochemistry and Photobiology—2003.*
U.S. Appl. No. 14/172,370, filed Feb. 4, 2014, Vohra, et al.
http://www.ncbi.nlm.nih.gov/pubmed/24701904, Labaran et al., "Photocatalytic Removal of Selenite and Selenate Species: Effect of EDTA and Other Process Variables." May-Jun. 2014.
http://pubs.acs.orq/doi/aba/10.1021/ac400934e. Shih et al., "Development of a Titanium Dioxide-Coated Microfluidic-Based Photocatalyst-Assisted Reduction Device to Couple High-Performance Liquid Chromatography with Inductively Coupled Plasma-Mass Spectrometry for Determination of Inorganic Selenium Species." American Chemical Society, Sep. 25, 2013.

* cited by examiner

METHODS AND SYSTEMS FOR SELENOCYANATE REMOVAL FROM CONTAMINATED AQUEOUS MEDIA

BACKGROUND OF THE INVENTION

Technical Field

The present invention relates to methods and systems for removing selenocyanate ($SeCN^-$) from contaminated aqueous media. More specifically, the present invention relates to methods and systems for removing selenocyanate and associated selenium species (selenite and selenate) from contaminated aqueous media by photocatalysis.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Selenium (Se) is a metalloid that is present in the earth's crust, often in associate with sulfur-containing minerals. It is normally found in low concentrations of 50-90 µg/kg, but higher concentrations can be associated with some volcanic, sedimentary and carbonate rocks. Selenium concentrations in soils vary widely, from 5 to 1,200,000 µg/kg, being higher in soils of more recent volcanic origin. Due to its multiple possible oxidation states, selenium occurs in soils in several forms: selenides ($Se^{2-}$), amorphous or polymeric elemental selenium ($Se^0$), selenites ($Se^{4+}$) and selenates ($Se^{6+}$).

Selenium also plays an important biological role in most, if not all animals, in the form of the amino acids selenocysteine and selenomethionine, as well as the proteins formate dehydrogenase and thioredoxin reductase. Selenium is therefore an essential micronutrient to many living organisms, but at high concentrations, selenium can pose serious health hazards. For example, accumulation of high concentrations of selenium in human can result in signs and symptoms such a garlic odor on the breath, gastrointestinal disorders, hair loss, sloughing of nails, fatigue, irritability, neurological damage and, in extreme cases, cirrhosis of the liver, pulmonary edema, and even death.

Elemental selenium and most metallic selenides have relatively low toxicities because of their low bioavailability. By contrast, selenates and selenites that are largely generated by industries are very toxic, having an oxidant mode of action similar to that of arsenic trioxide.

High concentrations of selenium or selenium contamination are not limited to natural causes as previously set forth. Human activities that are major sources of selenium pollution include, for example, copper refinement, oil or petroleum refinement, mining, minerals processing, agriculture, and coal-based power generation.

More recently, selenocyanate has also generated attention as another highly toxic inorganic selenium-containing species that can be found in effluents from oil refineries and coal-based generating plants, including, in particular, refineries processing oil from selenium-containing stocks (e.g. seleniferous crudes, shales and coals) produced by High Pressure Injection (HPI) and clean coal plants using an integrated gasification combined cycle (IGCC) and flue gas desulfurization (FGD).

Selenium in the form of selenate and selenite can be removed from water by treating the water in biological reactors, for example as described in U.S. Pat. No. 6,183,644 and International Publication Number WO 2007/012181 (each incorporated herein by reference in its entirety), and as used in ABMet™ reactors sold by the General Electric Company. However, the ABMet™ system is not able to remove reduced selenium species such as selenocyanate and these systems require a large area of available land.

Selenocyanate may also be treated by precipitation using additives such as elemental iron or copper (II) salts. These processes consume the additives used to cause precipitation and create a large amount of hazardous sludge such as ferrous selenide and $\alpha$-$Cu(S_{0.91}Se_{0.09})CN$ (U.S. Pat. Nos. 5,993,667, 6,214,238; Manceau, A., Gallup, D. L. Environ. Sci. Technol. 1997 31, 968-976; Meng, X, Bang, S., Korfiatis, G. P. Water Research 2002 36, 3867-3873—each incorporated herein by reference in its entirety).

It is noteworthy that while selenite is amenable to removal via conventional co-precipitation, selenate and selenocyanate are relatively recalcitrant towards most precipitation technologies.

Attempts have also been made to oxidize selenocyanate prior to introducing the adsorbent; oxidizing agents which have been employed have included air, ozone, hydrogen peroxide, and chlorine dioxide. None of these oxidants has proven entirely satisfactory: air is ineffective for oxidizing selenocyanate, while ozone and peroxide require highly alkaline conditions for maximum effectiveness. Chlorine dioxide oxidizes selenocyanate effectively at neutral pH, but it is unstable in aqueous solution and would have to be generated as needed.

U.S. Patent Application Publication 20130193071A1 describes a process of removing selenocyanate or selenite by contacting an aqueous effluent with a phenol oxidizing enzyme (i.e. peroxidase, laccase) and a suitable oxidizing agent such as hydrogen peroxide and oxygen (incorporated herein by reference in its entirety).

In view of the foregoing, there remains a need for solutions that can effectively remove different inorganic selenium-containing species from industrial effluent. Among the advantages that the present invention may offer include the ability to remove certain recalcitrant selenium species (e.g. selenocyanate) without generating by-products such as sludge and precipitate.

BRIEF SUMMARY OF THE INVENTION

According to one aspect, there is provided a process of removing selenocyanate from a selenocyanate-containing aqueous medium. The process comprises contacting the selenocyanate-containing aqueous medium with $TiO_2$ particles in the presence of UV light to photolyse selenocyanate into elemental selenium and to oxidize elemental selenium to selenite then selenate, adding a hole scavenger to the selenocyanate-containing aqueous medium to initiate reduction of selenate and/or selenite to elemental selenium and removing the resulting elemental selenium as an amorphous solid.

In one or more embodiments, the elemental selenium is oxidized by at least hydroxyl radicals formed by the oxidation of hydroxyl ions formed at the $TiO_2$ surface by positive holes generated by the photoactivation of the $TiO_2$ particles.

In one or more embodiments, the process does not produce a by-product that is substantially free of elemental selenium, the by-product being selected from the group consisting of sludge, slurry and precipitate.

In one or more embodiments, the selenocyanate is photolysed and the elemental selenium is oxidized at up to 50 ppb/min.

In one or more embodiments, wherein the selenocyanate-containing aqueous medium is in a pH range of 4-12.

In one or more embodiments, the selenocyanate-containing aqueous medium is in a temperature range of 20-70° C.

In one or more embodiments, the hole scavenger is added to the selenocyanate-containing aqueous medium only after complete oxidation of elemental selenium to selenate in order to minimize competitive oxidation of the hole scavenger at the expense of selenium.

In one or more embodiments, the hole scavenger is selected from the group consisting of methanol, ethanol, 2-propanol, 1-propanol, isopropanol, triethanolamine, citric acid, salicylic acid, EDTA, acetic acid, formic acid, propionic acid, malonic acid, sucrose, Hg(I), Cd(II) and Ag(I).

In one or more embodiments, the hole scavenger is EDTA.

In one or more embodiments, the average particle size of the $TiO_2$ particles is 0.1-0.8 μm in diameter.

In one or more embodiments, the average particle size of the $TiO_2$ particles is less than 100 nm in diameter.

In one or more embodiments, the process is implemented in batch mode with the $TiO_2$ particles being dispersed and suspended in the selenocyanate-containing aqueous medium.

In one or more embodiments, the $TiO_2$ particles are dispersed and suspended in the selenocyanate-containing aqueous medium at 0.5-1.5 g/L based on the volume of the selenocyanate-containing aqueous medium.

In other embodiments, the process is implemented in fixed mode with the $TiO_2$ particles being affixed to a substrate, the substrate being selected from the group consisting of glass including glass-plate; quartz; stainless steel; an alumina-based substrate; a silica-based substrate; and a mesoporous or nanoporous polymeric membrane.

In one or more embodiments, the selenocyanate-containing aqueous medium is wastewater or process water from at least one industry selected from the group consisting of hydrocarbon processing including hydrocarbon processing from seleniferous crudes, shales and coals; coal-based power generation including plants using an integrated gasification combined cycle and/or flue gas desulfurization; fossil fuel-based mining; minerals processing including copper refinement; and agriculture.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
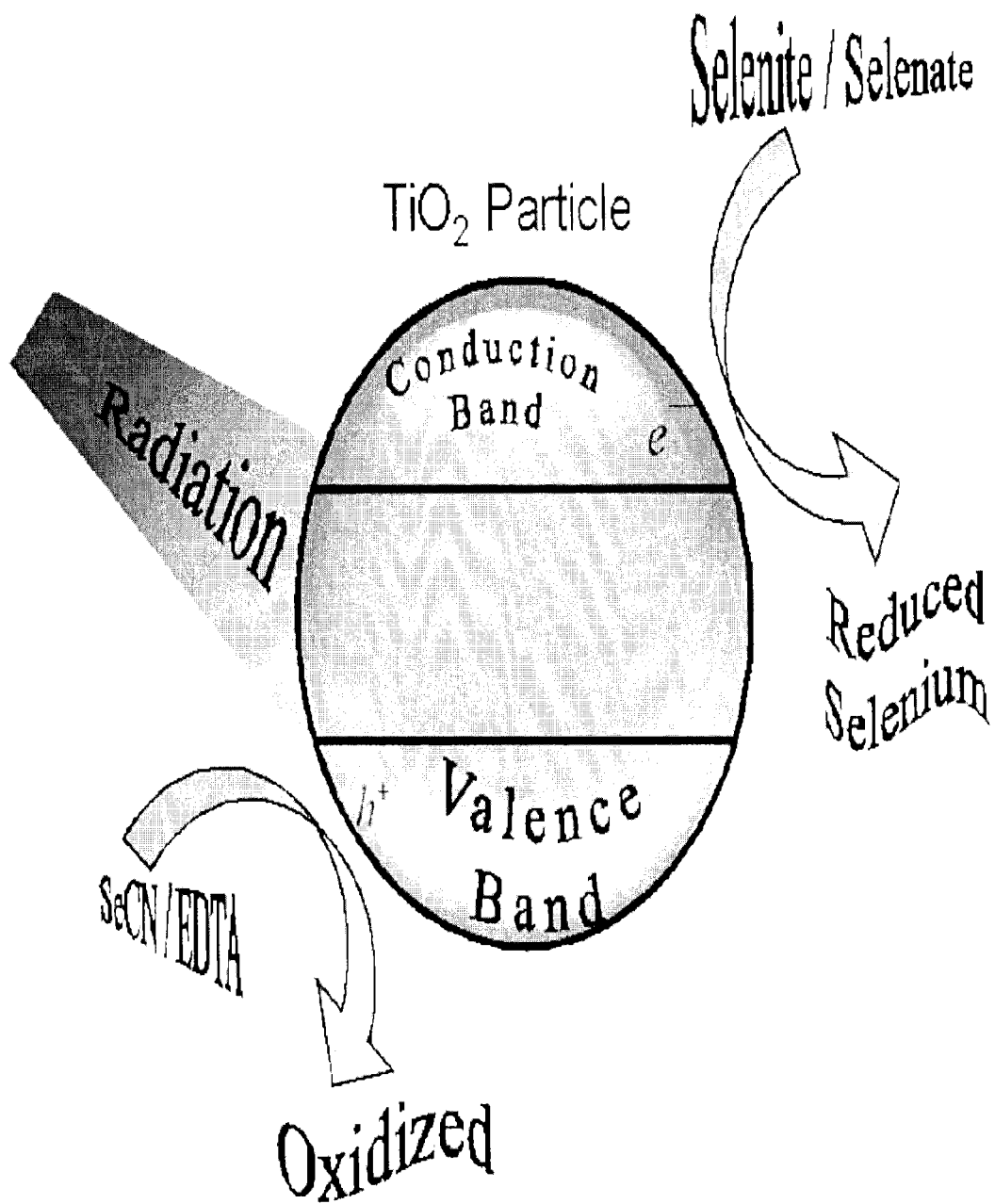
FIG. 1 illustrates the mechanism of selenocyanate photodegradation and oxidation by $TiO_2$ photocatalysis in an aqueous environment according to one embodiment.

Referring now to the drawings, wherein like reference numerals designate identical or corresponding parts throughout the several views.

The present invention relates to a process of treating an aqueous medium containing or contaminated with at least selenocyanate ($SeCN^-$) and removing the selenocyanate and other associated selenium species such as selenite ($SeO_3^{2-}$) and selenate ($SeO_4^{2-}$) from the aqueous medium.

In some embodiments, the selenocyanate ions in the treated aqueous medium can be found as salts and acid derivatives, including but not limited to potassium selenocyanate, mercuric selenocyanate, mercurous selenocyanate, silver selenocyanate, cesium selenocyanate, copper selenocyanate, sodium selenocyanate, zinc selenocyanate, lead selenocyanate, magnesium selenocyanate, selenocyanic acid and isoselenocyanic acid.

In certain embodiments, the aqueous medium can contain other inorganic and organic selenium species, including but not limited to selenic acid, selenium dioxide, selenourea, seleninyl bis(dimethylamide), selenium hexafluoride, Selsun Blue, seleninyl bromide, selenium monosulfide, sodium selenite, selenious acid, selenium tetrachloride, sodium selenate, selenium (colloidal), 2-selenoethylguanidine, selenium disulfide, selenium anhydride, 6-selenoguanosine, selenium monochloride, selenium trioxide, selenomethionine, selenium oxychloride and selenium dimethyldithiocarbamate. The process provided herein employs a photocatalytic degradation, oxidation and reduction strategy to remove selenocyanate from the aqueous medium. As used herein, photocatalysts is the acceleration of a photoreaction in the presence of a catalyst. Presently, the most common photocatalytic systems generally include one or more ultraviolet (UV, ~10-400 nm) or visible light (~400-700 nm) energy sources for irradiating UV or visible light onto an organic substrate in the presence of a photocatalyst. Titanium dioxide ($TiO_2$) apart from being highly photoactive, is also light, strong, anti-corrosive, stable and inexpensive. In a UV/$TiO_2$ photocatalytic process, $TiO_2$ photocatalysts, when excited by radiation with a wavelength less than 400 nm (radiation in the UV range), absorb the radiation energy and generate electron-hole pairs ($e^-/h^+$) owing to a band gap of around 3.2 eV. In the presence of molecular oxygen and/or water, these electron-hole pairs can lead to the formation of superoxide ($O_2^-$.) and hydroxyl free radicals (OH.), which are potent oxidizing agents and can then in turn undergo secondary reactions such as oxidation and degradation.

The removal of selenium protonated oxyanions (selenite and selenate) from aqueous solutions by photocatalysis has been previously described in the literature, such as in Labaran, B. A., Vohra, M. S. Environ. Technol. 2014 35(9-12): 1091-1100; Kim, J, Lim, H. B. Bull. Korean Chem. Soc. 2013 34(11): 3362-3366; Wang, Q., Liang, J., Qiu J., Huang B. J. Anal. At. Spectrom. 2004 19: 715-716; Nguyen, V. N. H., Amal, R., Beydoun, D. Chem. Eng. Sci. 2006 60(21): 5759-5769; Kikuchi, E, Sakamoto, H. J. Electrochem. Soc. 2000 147(12): 4589-4593, all of which are incorporated herein by reference in their entireties. In these processes, selenite and selenate are separated or speciated by photocatalytic reduction. For example, after the UV light-induced formation of electron-hole pairs by the $TiO_2$ photocatalyst, selenite and selenate can be reduced to elemental selenium (Se or Se(0)) by the conduction band electrons (e) according to two or more of the following equations:

$$SeO_4^{2-} \rightarrow SeO_3^{2-} + O_2 \qquad \text{(Equation 1)}$$

$$2SeO_3^{2-} + \rightarrow 2Se + 3O_2 + 4e^- \qquad \text{(Equation 2)}$$

$$SeO_4^{2-} + \rightarrow Se + 2O_2 + 2e^- \qquad \text{(Equation 3)}$$

The Se(0) that is formed (brick red in color) is insoluble in water and is therefore removed by precipitation as an amorphous solid.

Interestingly, selenium has also been associated with enhancing the photocatalytic activity of $TiO_2$ (Rockafellow, E. M., Haywood, J. M., Witte, T., Houk, R. S., Jenks, W. S. Langmuir 2010 26(24): 19052-19059; Gurkan, Y. Y., Kasapbasi. E. Cinar, Z. Chem. Eng. J. 2013 214: 34-44—each incorporated herein by reference in its entirety). The $TiO_2$ photocatalysts can be either doped or modified with elemental selenium or Se(IV) ions, for example, by wetness impregnation method.

On the other hand, the application of photocatalysis in the treatment of selenocyanate-contaminated wastewater, to the best knowledge of the applicants, has not been documented.

Selenocyanate is chemically different from selenite and selenate, most notably by the lacking of oxygen in the anion and the non-protonation of the selenium moiety. The other moiety in selenocyanate is a cyano group that consists of a carbon atom that is triple-bonded to a nitrogen atom. Understandably, selenocyanate poses new challenges to treatment and has been known to be recalcitrant towards many precipitation techniques.

According to the present disclosure, the process of removing selenocyanate from an aqueous medium can be divided into two parts: (i) Photolysis of the selenocyanate complex and oxidation of Se(0) to Se(IV) then Se(VI) or a mixture thereof; (ii) Oxidation of a hole scavenger and reduction of Se(IV) and Se(VI) to Se(0). This photocatalytic process offers the synergy and the dual advantage of selenocyanate complex destruction followed by removal by reduction of Se(IV) and/or Se(VI) to Se(0).

Referring to FIG. 1, where a mechanism of selenocyanate degradation and oxidation by $UV/TiO_2$ photocatalysis in an aqueous environment is provided. The aqueous medium in FIG. 1 is contaminated with at least selenocyanate and may also contain other toxic, inorganic selenium species such as selenite and selenate. Examples of selenocyanate-contaminated aqueous media include but are not limited to industrial effluent or wastewater from oil refineries and coal-based generating plants, especially refineries processing oil from selenium-containing stocks (e.g. seleniferous crudes, shales and coals) produced by High Pressure Injection (HPI) and clean coal plants using an integrated gasification combined cycle (IGCC) and flue gas desulfurization (FGD), and any other fossil fuel-based power and mining plants. In addition to the selenium contaminant species, the aqueous medium also contains $TiO_2$ particles that are artificially added for treatment purposes in batch mode. As $TiO_2$ is water-insoluble, these particles are suspended in the aqueous medium, forming a $TiO_2$ suspension.

In the first part of the selenocyanate removal process, $TiO_2$ particles, upon illumination by UV light, absorb the radiation energy and generate electron-hole pairs ($e^-/h^+$) with a gap of ~3.2 eV or ~415 nm between the conduction (comprising e) and valence (comprising $h^+$) bands:

$$TiO_2 \xrightarrow{h\nu} e^- + h^+ \quad \text{(Equation 4)}$$

The UV light has a wavelength of 10-400 nm, preferably 300-400 nm, more preferably 315-385 nm with a peak maximum of 345-355 nm.

The UV light also induces the photolysis of selenocyanate, which is key to the success of ultimate removal of selenocyanate from the aqueous medium. As used herein, photolysis, photodegradation, photodecomposition or photodissociation refers to a chemical reaction in which a chemical compound is broken down by photons. In this case, the single covalent bond between selenium and the cyano group in selenocyanate is broken down by the UV photons according to Equation 5, thereby yielding elemental selenium (Se or Se(0)) and cyanide:

$$SeCN^- \xrightarrow{h\nu} Se + CN^- \quad \text{(Equation 5)}$$

In a separate process, the released cyanide can be treated by any conventional cyanide treatment methods that are known in the art, for example, cyanide oxidation that converts cyanide to cyanate ($OCN^-$), a less toxic species.

Meanwhile, subsequent to the generation of the $e^-$-$h^+$ pairs, superoxide ($O_2^-\cdot$) and hydroxyl radicals (OH·) are formed through redox reactions as set forth in Equations 6 and 7:

$$O_2 + e^- \rightarrow O_2^{-\cdot} \quad \text{(Equation 6)}$$

$$H_2O + h^+ \rightarrow OH\bullet + H^+ \quad \text{(Equation 7)}$$

Oxygen molecules present in the aqueous medium are reduced by the conduction band electrons into superoxide, a moderately reactive radical while water molecules are oxidized by the positive holes into hydroxyl radical, which is highly reactive.

In some embodiments $O_2^-\cdot$ can further convert into OH· under UV irradiation:

$$O_2^-\bullet + 2h^+ + 2e^- \rightarrow H_2O_2 \xrightarrow{h\nu} OH\bullet + OH^- \quad \text{(Equation 8)}$$

The OH· and/or $O_2^-$· radicals oxidize the elemental selenium released from the photolysis of selenocyanate according to at least one of Equations 9-14:

OH· oxidation of Se(0) to Se(IV), then Se(IV) to Se(VI):

$$2Se + 6OH\bullet + 4e^- \rightarrow 2SeO_3^{2-} + 3H_2 \quad \text{(Equation 9)}$$

$$2SeO_3^{2-} + O_2 \rightarrow 2SeO_4^{2-} \quad \text{(Equation 10)}$$

OH· oxidation of Se(0) to Se(IV):

$$2Se + 8OH\bullet + 4e^- \rightarrow 2SeO_3^{2-} + 4H_2 \quad \text{(Equation 11)}$$

$O_2^-$· oxidation of Se(0) to Se(IV), then Se(IV) to Se(VI):

$$2Se + 3O_2^-\bullet + e^- \rightarrow 2SeO_3^{2-} \quad \text{(Equation 12)}$$

$$2SeO_3^{2-} + O_2^-\bullet \rightarrow 2SeO_4^{2-} + e^- \quad \text{(Equation 13)}$$

$O_2^-$· oxidation of Se(0) to Se(VI):

$$2Se + 4O_2^-\bullet \rightarrow 2SeO_4^{2-} \quad \text{(Equation 14)}$$

Alternatively or additionally, Se(0) released from the photolysis of selenocyanate is oxidized by the positive holes generated in the UV-photoexcited $TiO_2$:

$h^+$ oxidation of Se(0) to Se(IV), then Se(IV) to Se(VI):

$$Se + 3H_2O + h^+ \rightarrow SeO_3^{2-} + 6H^+ + 4e^- \quad \text{(Equation 15)}$$

$$SeO_3^{2-} + O_2 \rightarrow SeO_4^{2-} \quad \text{(Equation 16)}$$

$h^+$ oxidation of Se(0) to Se(VI):

$$Se + 4H_2O + h^+ \rightarrow SeO_4^{2-} + 8H^+ + 6e^- \quad \text{(Equation 17)}$$

The oxidation of Se(0) and Se(IV) is allowed to run until completion or at least near completion, for example at least 95% complete, preferably at least 98%, more preferably at least 99%. The extent of the oxidation can be predetermined by measuring the amount of Se(0) (precipitated by photolysis and unoxidized) and/or Se(VI) (formed by oxidation and can be captured by filtration through a microfilter) by techniques such as inductively coupled plasma-mass spectroscopy (ICP-MS) or inductively coupled plasma-atomic emission spectroscopy (ICP-AES), which in turn can be used to estimate the time taken or rate of the oxidation. The aqueous medium treated by the photocatalytic process can contain varying amounts of selenocyanate, depending on the source of the sample. For example, sour water strippers that are commonly found in gas processing facilities, sulfur recovery units, wellhead facilities, and refinery applications can contain an amount of selenocyanate as high as up to 5,000 ppb, for example 1,000-5,000 ppb, preferably 2,000-4,000 ppb, more preferably 2,500-3,500 ppb. Other types of industrial wastewater samples contain less than 1,000 ppb of selenocyanate in ranges such as 1-100 ppb, 100-250 ppb, 250-500 ppb and 500-1000 ppb. In other embodiments, the selenocyanate concentration is lower than 1 ppb or 1,000 ppm, for example, 10-1,000 ppm, preferably 50-800 ppm, more preferably 100-750 ppm.

When the selenocyanate photocatalytic removal process is run in batch mode, $TiO_2$ is dispersed in an aqueous medium sample to a concentration range of 0.1-5.0 g/L based on the volume of the treated aqueous medium sample, preferably 0.2-2.5 g/L, more preferably 0.5-1.5 g/L. The $TiO_2$ used is generally but not limited to powder form, and can be sourced from minerals such as ilmenite, rutile and anatase. The $TiO_2$ average particle size can range 0.05-0.8 µm in diameter, preferably 0.1-0.5 µm, more preferably 0.2-0.4 µm. In some embodiments, $TiO_2$ nanoparticles (<100 nm in size) are advantageously used for increased surface area for photocatalytic activity. The $TiO_2$ nanoparticles have an average particle size of 10-100 nm, preferably 25-75 nm, more preferably 30-50 nm (diameter).

For purposes of the present invention, "parts per million" or "ppm" and "parts per billion" or "ppb" refer to an expression of concentration by mass or weight. For example, 1 ppm of selenocyanate or $TiO_2$, which is equivalent to 1 mg/L or 0.001 g/L denotes 1 part of selenocyanate or $TiO_2$ per 1,000,000 or $10^6$ parts, wherein $10^6$ parts is the total weight of the treated selenocyanate-contaminated aqueous medium. Similarly, 1 ppb of selenocyanate or $TiO_2$, which is equivalent to 1 ng/L denotes 1 part of selenocyanate or $TiO_2$ per 1,000,000,000 or $10^9$ parts, wherein $10^9$ parts is the total weight of the selenocyanate-contaminated aqueous medium under treatment.

The combined photolysis of selenocyanate to Se(0) and oxidation of Se(0) to Se(IV) and Se(VI), according to the present disclosure, occurs at an average rate of up to 50 ppb/min, preferably 0.1-50 ppb/min, more preferably 1-30 ppb/min, even more preferably 5-25 ppb/min. Advantageously, within the first hour or 60 min of the photolysis/oxidation, more than 80% of the Se(0) formed by selenocyanate photolysis is converted to Se(VI), preferably more than 90%, more preferably more than 95%.

After the completion or near completion of the oxidation of Se(0) and Se(IV) as previously defined, the second part of the selenocyanate removal process (not shown in FIG. 1) involving a reduction route wherein Se(VI) and/or Se(IV) are reduced to Se(0) begins. In some embodiments, the selenium oxyanions are reduced by the conduction band electrons ($e^-$) according to two or more of Equations 1-3.

Hence, in accordance with selenocyanate removal process of the present disclosure, selenocyanate is removed as precipitated elemental selenium, Se(0) without forming other by-products such as sludge, slurry and precipitate other than Se(0). The selenocyanate removal process is successful in removing at least 95% of the selenocyanate ions initially present in the contaminated aqueous medium before treatment, preferably at least 99%, more preferably at least 99.5%, even more preferably at least 99.9%.

The reduction is initiated by the addition of a hole scavenger into the treated aqueous medium. During photocatalytic reduction processes, the presence of a hole scavenger, which can be an organic or an inorganic compound, is necessary. This is because oxygen is normally not desired in the photoreduction processes as it competes with the substrate, which is Se(VI) in the present case, for the photogenerated conduction electrons. For efficient photoreduction, it is desired that the oxidation of the hole scavenger is relatively straightforward. Furthermore, the hole scavenger will remove the photogenerated positive holes and therefore arrest the production of OH. from oxidation of water molecules. It is important to add the hole scavenger to the aqueous medium only after complete selenium oxidation to selenate in order to minimize competitive oxidation of the hole scavenger at the expense of selenium. This is unlike what is conventionally practiced in the art, such as U.S. Patent Application Publication 20070007121 where an organic acid is added at time zero or at the beginning of photocatalysis.

Examples of the organic hole scavenger compounds include but are not limited to alcohols (e.g. methanol, ethanol, 2-propanol, 1-propanol, isopropanol), amines (e.g. triethanolamine), carboxylic acids (e.g. citric acid, salicylic acid, ethylenediaminetetraacetic acid (EDTA), acetic acid, formic acid, propionic acid, malonic acid) and sucrose. Inorganic hole scavenger compounds include but are not limited to Hg(II), Cd(II) and Ag(I). In some embodiments, an organic hole scavenger is preferred. In at least one embodiment, EDTA is used as the hole scavenger and is added to the treated aqueous medium at an amount range of 10-1,000 ppm, preferably 50-800 ppm, more preferably 100-500 ppm. Apart from hole-scavenging, EDTA can also have chelating and adsorption properties that help to remove Se(VI) and Se(IV).

In accordance with the present disclosure, selenocyanate can be successfully photodissociated and oxidized, in conjunction with the use of a hole scavenger, over acidic, neutral and basic ranges, i.e. from pH 4-12.

In some embodiments, the selenocyanate treatment process is carried out at ambient temperatures (20-26° C. with an average of 23° C.). In other embodiments, the temperature can be raised to up to 70° C., for example 35-70° C., preferably 40-65° C., more preferably 50-60° C.

The selenocyanate treatment process according to the present disclosure is not limited to a batch mode implementation. In some embodiments, the $TiO_2$ photocatalyst particles are affixed to and supported on various rigid substrates that are inert to the photooxidation/photoreduction reactions, such as but not limited to glass, quartz, stainless steel, other types of alumina- or silica-based substrates and a meso- or nanoporous polymeric membrane such as polyacrylonitrile matrix membrane where $TiO_2$ particles are microencapsulated. The $TiO_2$ photocatalyst particles may be affixed to the substrate in any reasonable manner, such as affixed to the surface of the substrate or alternately, at least partially embedded within the substrate or both. In one embodiment, $TiO_2$ is coated on the surface of a glass-plate substrate (transparent or opaque) to prepare $TiO_2$ thin films with a thickness of 100 nm-2 µm, preferably 100 nm to 1 µm, more preferably 250-900 nm, even more preferably 500-750 nm.

In certain embodiments, the $TiO_2$ thin films exhibit a porous topography, with pore diameters ranging from 1 nm to 1 µm, preferably 50-800 nm, more preferably 100-500 nm. The depths of the pores range from 1-250 nm, preferably 40-150 nm, more preferably 20-70 nm, even more preferably 10-20 nm. $TiO_2$ particles can be supported on the glass-plate substrate at 10-80 wt. % where the weight percentage is based on the weight of the substrate, preferably 20-70 wt. %, more preferably 30-60 wt. %.

$TiO_2$ photocatalyst particles can be loaded or deposited on these supports by techniques such as dip coating, spin coating, sol-gel, metal organic/plasma enhanced chemical vapor deposition, reactive plasma/radio frequency magnetron sputtering, ion beam technique, electron beam evaporation and electrophoresis. Among these techniques, the sol-gel technique, which is a method for producing solid materials from small molecules, is known to be used for the fabrication of metal oxides, especially the oxides of silicon and titanium. The process involves conversion of monomers into a colloidal solution (sol) that acts as the precursor (usually a metal alkoxide such as titanium alkoxide) for an integrated network (or gel) of either discrete particles or network polymers.

Embodiments of the present disclosure also include a photoreactor system that can implement the selenocyanate removal process from a selenocyanate-contaminated aqueous medium on different scales: household or pilot (up to 100 L such as 1-10 L, 10-50 L and 50-100 L) and industrial (1,000 L and above, e.g. 1,000-5,000 L, 5,000-10,000 L or 10,000-20,000 L). The photoreactor system includes at least a UV lamp that is enclosed within a specific tubular space provided by an immersion glass sleeve which is advantageously made of quartz and also advantageously self-cleaning. The UV lamp, which can be a mercury vapor lamp or a metal halide lamp with high, medium or low pressure, has a wavelength of 10-400 nm, preferably 300-400 nm, more preferably 315-385 nm with a peak maximum of 345-355 nm.

The photoreactor system also includes a closed treatment vessel that holds the aqueous medium and during treatment, the UV lamp together with the immersion glass sleeve is at least partially submerged in the treated aqueous medium. When the treatment process is implemented in batch mode, $TiO_2$ particles are dispersed into the aqueous medium to form a $TiO_2$ suspension. Alternatively, the treatment process is implemented in fixed mode and supported $TiO_2$, such as one or more $TiO_2$ thin films or $TiO_2$ membranes can be placed within the treatment vessel and is in direct contact and totally submerged in the treated aqueous medium. In one embodiment, one or more $TiO_2$ thin films or membranes can be affixed to the outer surface of the immersion glass sleeve.

In some embodiments, the treatment vessel, like the immersion glass sleeve, is made of glass, preferably quartz glass and is preferably self-cleaning. The treatment vessel can further include other parts such as sampling ports such as sample inlets and sample outlets, air inlet for aeration of the aqueous sample, etc.

In some embodiments, the photoreactor system can include a tempering jacket or a cooling tube that is placed near the UV lamp to prevent overheating. Further, the photoreactor system can include a motor, a speed controller, one or more pressure and circulation pumps to regulate the flow and circulation of an aqueous medium sample to be photocatalytically treated. Continuous stirring of the treated aqueous medium sample can be provided, for example, by a magnetic bar and a magnetic stirrer from the bottom of the treatment vessel. The continuous stirring is especially beneficial when the UV/$TiO_2$ selenocyanate treatment process is implemented in batch mode because the mechanical movement keeps the $TiO_2$ catalyst particles in suspension.

The examples below further illustrate the protocols of a pilot study conducted by the inventors while designing the process of removing selenocyanate from a contaminated aqueous medium in accordance with the present disclosure, and is not intended to limit the scope of the invention.

Example 1

All chemicals used for the present invention were of high purity reagent grade quality. The major chemicals that were used include $TiO_2$ (P25, DEGUSSA), $Na_2CO_3$ (BDH), $NaHCO_3$ (BDH), $HClO_4$ (BAKER), NaOH (FISHER), potassium selenocyanate KSeCN (ALDRICH), sodium selenite $Na_2SeO_3$ (ALDRICH), potassium selenate $K_2SeO_4$ (ALDRICH), disodium EDTA (FISHER), and pH calibration standards (FISHER).

Example 2

Figure 2:
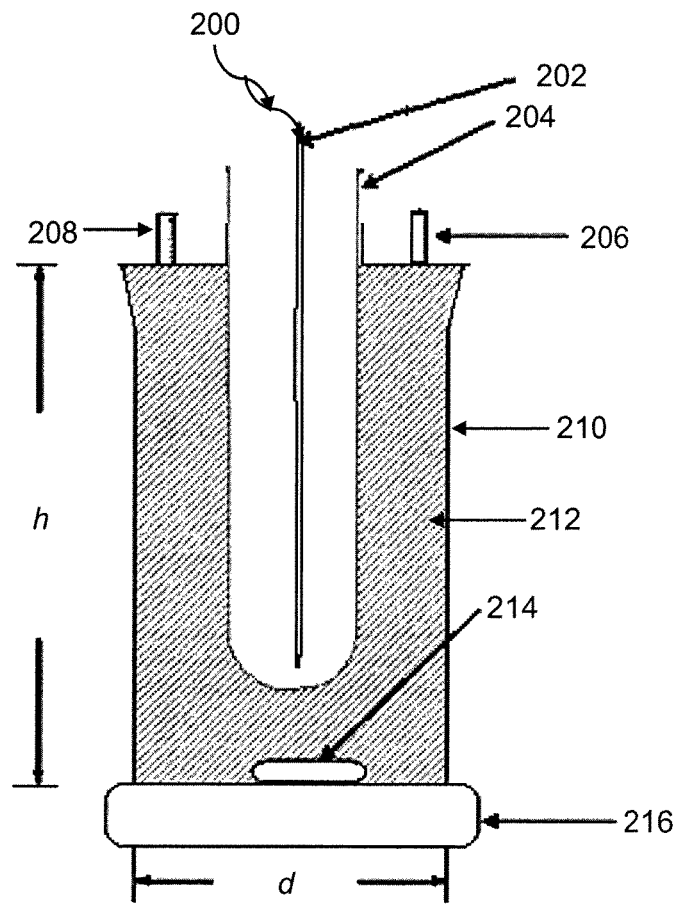
FIG. 2 is a schematic diagram of a reactor system setup for the removal of selenocyanate, selenite and selenate by UV/$TiO_2$ photocatalysis according to one embodiment.

Referring to FIG. 2, where an exemplary UV/$TiO_2$ photoreactor system 200 for the removal of selenocyanate is shown. The photoreactor system 200 includes, at least a 1,000 mL Pyrex glass batch-type vessel 210 with a diameter (d) of 7 cm and a height (h) of 30 cm, a UV lamp 202 and a glass sleeve 204 containing the UV lamp.

Batches of test solutions were prepared using high purity water (CORNING Mega Pure™ System) and stock solutions of respective chemicals. 1.1 L of the test solution was prepared for each experiment, out of which 0.1 L was taken as a blank sample before the addition of photocatalyst. After this, 1 g $TiO_2$ photocatalyst was added to remaining 1 L test solution and initial pH was adjusted to the desired value using HCl or NaOH solutions. The reactor system 200 was kept in suspension using a magnetic bar 2314 and a magnetic stirrer 216 set up and was allowed to equilibrate for 20 min. The equilibrated, $TiO_2$-containing test solution 212 was then transferred to the glass vessel 210. The UV lamp 302 is a 15 W UV lamp (F15T8-BLB 15 W, Sankyo Denki, Japan) with 315-400 nm wavelength range and peak maximum at ~352 nm, positioned at in the center of the reactor system 300 and separated from the test solution 312 using the glass sleeve 204. Another blank sample was collected before turning on the UV lamp, to note any change in target pollutant concentration before photocatalysis because of adsorption. The photoreactor system 200 was fully covered with aluminium foil during experiment to ensure that light from UV lamp was the only light source. The UV lamp was then turned on and several samples were collected via sampling ports 206 and 208 at different time intervals.

The method disclosed herein may used at contaminated sites to first destroy the selenocyanate complex followed by reduction based removal of released selenium based species (i.e., selenite and selenate). The decomposition of the selenocyanate complex may occur under both acidic and basic pH values and over a wide concentration range. The results showed that selenocyanate disappearance occurred because of the decomposition of the selenocyanate complex, which is essential for the release of cyanide bound selenium species before its removal from the aqueous phase. The released selenium species is then converted or oxidized to selenite and selenate forms.

In the examples, the degradation was preferably run for at least 380 min so that the selenate amount showed near complete selenium recovery indicating that most selenocyanate complex has been destroyed followed by oxidation of released selenium to selenite and then to selenate. In other embodiment the degradation is run for at least 420 minutes, 460 minutes, 520 minutes, Using EDTA as hole scavenger indicated that for 300 ppm EDTA added at 380 min to the respective photoreactor (FIG. 2), the released selenate also showed near complete removal at reaction time higher than 380 min (after addition of EDTA) that was initiated by the reduction route to elemental selenium.

Hence, a prominent feature in one aspect of the present disclosure is the addition of EDTA at a specific time after the start of photocatalysis (i.e. 380 min), when all of the selenocyanate has been degraded and oxidized to selenite. The addition of EDTA only after complete selenocyanate degradation and oxidation to selenite minimizes competitive oxidation of EDTA at the expense of selenocyanate.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A process of removing selenocyanate from a selenocyanate-containing aqueous medium, comprising:
   contacting the selenocyanate-containing aqueous medium with $TiO_2$ particles in the presence of UV light to photolyse selenocyanate into elemental selenium and cyanide and to oxidize the elemental selenium to selenite then to selenate;
   adding a hole scavenger to the selenate to initiate reduction of the selenite and/or the selenate to an amorphous solid of elemental selenium, wherein the hole scavenger is added to the selenate only after complete degradation and oxidation of selenocyanate; and
   removing the resulting amorphous solid of elemental selenium.

2. The process of claim 1, wherein the elemental selenium is oxidized by at least hydroxyl radicals formed by the oxidation of hydroxyl ions formed at the $TiO_2$ surface by positive holes generated by a photoactivation of the $TiO_2$ particles.

3. The process of claim 1, wherein the process does not produce a by-product that is substantially free of elemental selenium, the by-product being selected from the group consisting of sludge, slurry and precipitate.

4. The process of claim 1, wherein the selenocyanate is photolysed and the elemental selenium is oxidized at up to 50 ppb/min.

5. The process of claim 1, wherein the selenocyanate-containing aqueous medium is in a pH range of 4-12.

6. The process of claim 1, wherein the selenocyanate-containing aqueous medium is in a temperature range of 20-70° C.

7. The process of claim 1, wherein the hole scavenger is selected from the group consisting of methanol, ethanol, 2-propanol, 1-propanol, isopropanol, triethanolamine, citric acid, salicylic acid, EDTA, acetic acid, formic acid, propionic acid, malonic acid, sucrose, Hg(I), Cd(II) and Ag(I).

8. The process of claim 1, wherein the hole scavenger is EDTA.

9. The process of claim 1, wherein the average particle size of the $TiO_7$ particles is 0.1-0.8 μm in diameter.

10. The process of claim 1, wherein the average particle size of the $TiO_7$ particles is less than 100 nm in diameter.

11. The process of claim 1, wherein the process is implemented in batch mode with the $TiO_2$ particles being dispersed and suspended in the selenocyanate-containing aqueous medium.

12. The process of claim 11, wherein the $TiO_2$ particles are dispersed and suspended in the selenocyanate-containing aqueous medium at 0.5-1.5 g/L based on the volume of the selenocyanate-containing aqueous medium.

13. The process of claim 1, wherein the process is implemented in fixed mode with the $TiO_2$ particles being affixed to a substrate, the substrate being selected from the group consisting of glass including glass-plate; quartz; stainless steel; an alumina-based substrate; a silica-based substrate; and a mesoporous or nanoporous polymeric membrane.

14. The process of claim 1, wherein the selenocyanate-containing aqueous medium is wastewater or process water from at least one industry selected from the group consisting of hydrocarbon processing including hydrocarbon processing from seleniferous crudes, shales and coals; coal-based power generation including plants using an integrated gasification combined cycle and/or flue gas desulfurization; fossil fuel-based mining; minerals processing including copper refinement; and agriculture.

15. The process of claim 1, wherein the hole scavenger is added to the selenate at least 380 minutes after the contacting.

16. The process of claim 1, further comprising removing the cyanide.

17. The process of claim 16, wherein the removing involves oxidation of the cyanide into cyanate.

* * * * *